United States Patent [19]

Becker

[11] Patent Number: 4,469,220
[45] Date of Patent: Sep. 4, 1984

[54] MAGNETIC COUPLING ASSEMBLY FOR ACCUMULATING POWER ROLL CONVEYOR

[75] Inventor: Lynn T. Becker, Byron, Mich.

[73] Assignee: Tri-Veyor Corp., Whitmore Lake, Mich.

[21] Appl. No.: 331,039

[22] Filed: Dec. 16, 1981

[51] Int. Cl.³ .............................................. B65G 13/06
[52] U.S. Cl. ..................................... 198/781; 464/29; 464/30
[58] Field of Search ..................... 198/781; 464/29, 30

[56] References Cited

U.S. PATENT DOCUMENTS

| | | | |
|---|---|---|---|
| 2,712,377 | 7/1955 | Eggleston | 198/781 |
| 3,327,837 | 6/1967 | Covell | 198/781 |
| 3,610,406 | 10/1971 | Fleischauer | 198/781 |
| 4,103,516 | 8/1978 | Marcin | 198/781 |
| 4,406,360 | 9/1983 | Smith et al. | 198/781 |

FOREIGN PATENT DOCUMENTS

| | | | |
|---|---|---|---|
| 2742579 | 3/1979 | Fed. Rep. of Germany | 198/781 |
| 2752610 | 5/1979 | Fed. Rep. of Germany | 198/781 |

*Primary Examiner*—Joseph E. Valenza
*Assistant Examiner*—Daniel R. Alexander
*Attorney, Agent, or Firm*—Cullen, Sloman, Cantor, Grauer, Scott & Rutherford

[57] ABSTRACT

A magnetic coupling assembly for driving a conveyor roll from a power drive while automatically disengaging the conveyor roll from the power drive when an accumulation occurs of the parts being transported by the conveyor. In one embodiment, a drive sprocket and conveyor roll are mounted on a fixed axle between a pair of spaced conveyor side rails. The conveyor roll includes a tube portion having a permanent magnet mounted therein and the drive sprocket includes a sprocket hub having a field face member secured to one of its ends in opposing relationship to the permanent magnet. By varying the air gap between the permanent magnet and field face member, the torque capacity is varied, thereby permitting slippage between the drive sprocket and conveyor roll at different torque levels. The sprocket hub is slidable on a bearing cartridge assembly and the field face member is slidable on a thrust tube in response to operation of an adjustment member for varying the air gap between the permanent magnet and field face member. Long service life is possible with minimum maintenance because of the total bearing construction. In another form of the invention, the drive sprocket is mounted outboard of the conveyor side rails. In this embodiment, the drive sprocket and conveyor roll are mounted on a rotatable axle with the basic components for the magnetic coupling assembly being the same as for the first embodiment.

4 Claims, 5 Drawing Figures

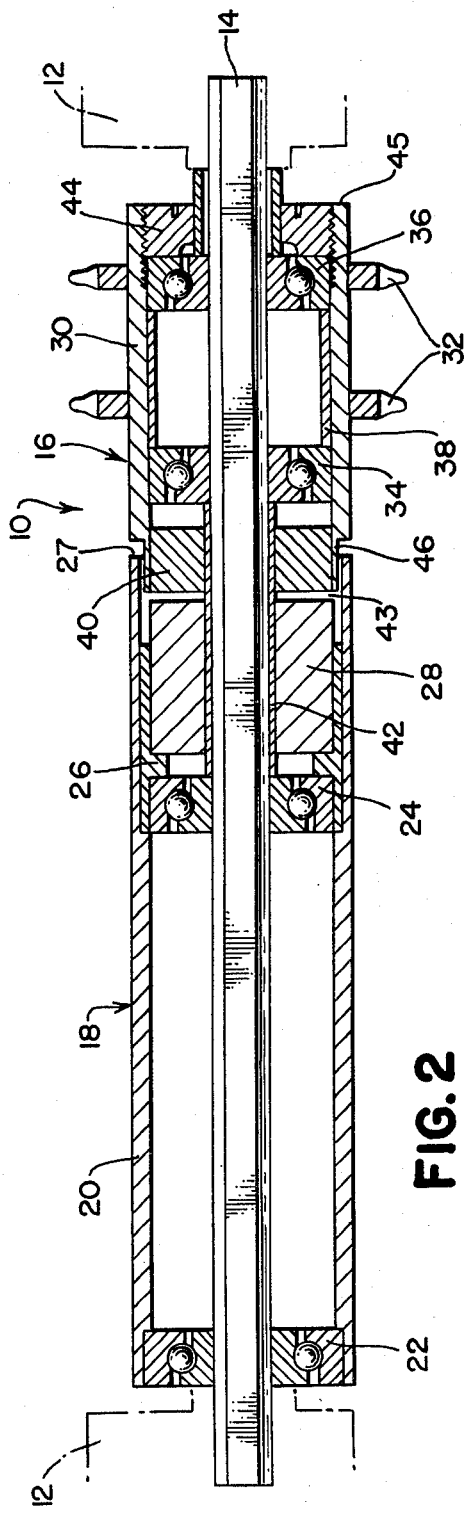
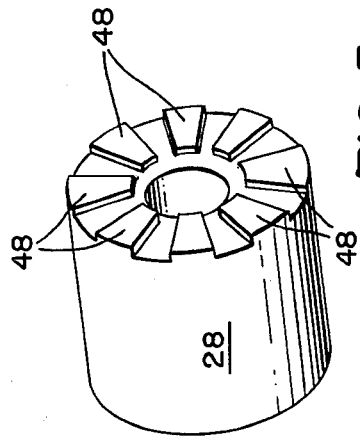
FIG. 5
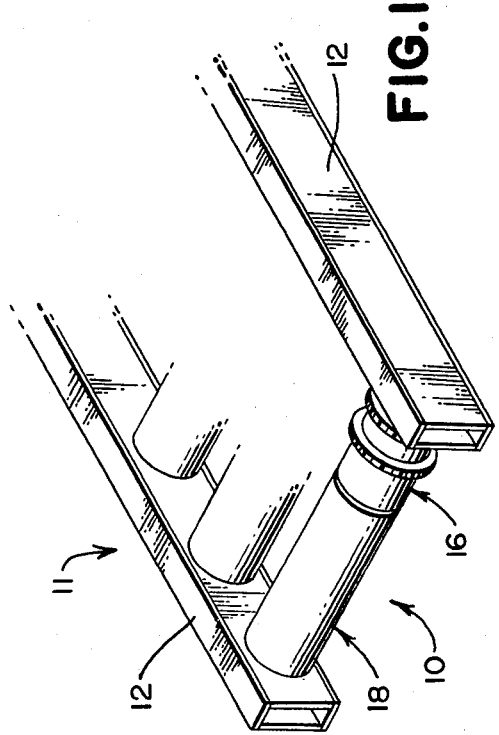
FIG. 1
FIG. 2

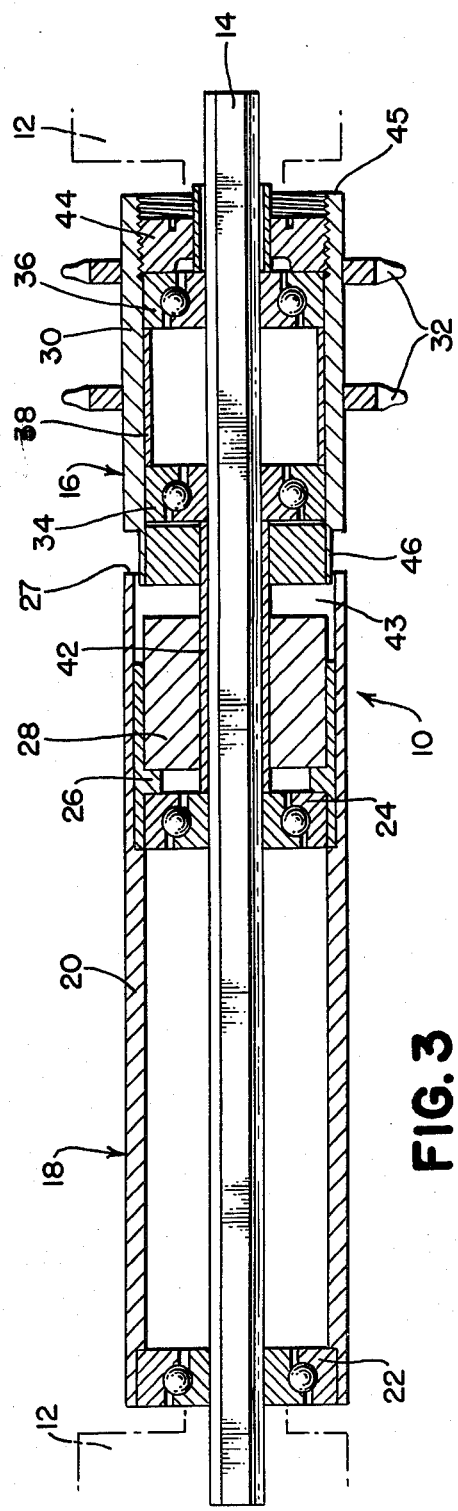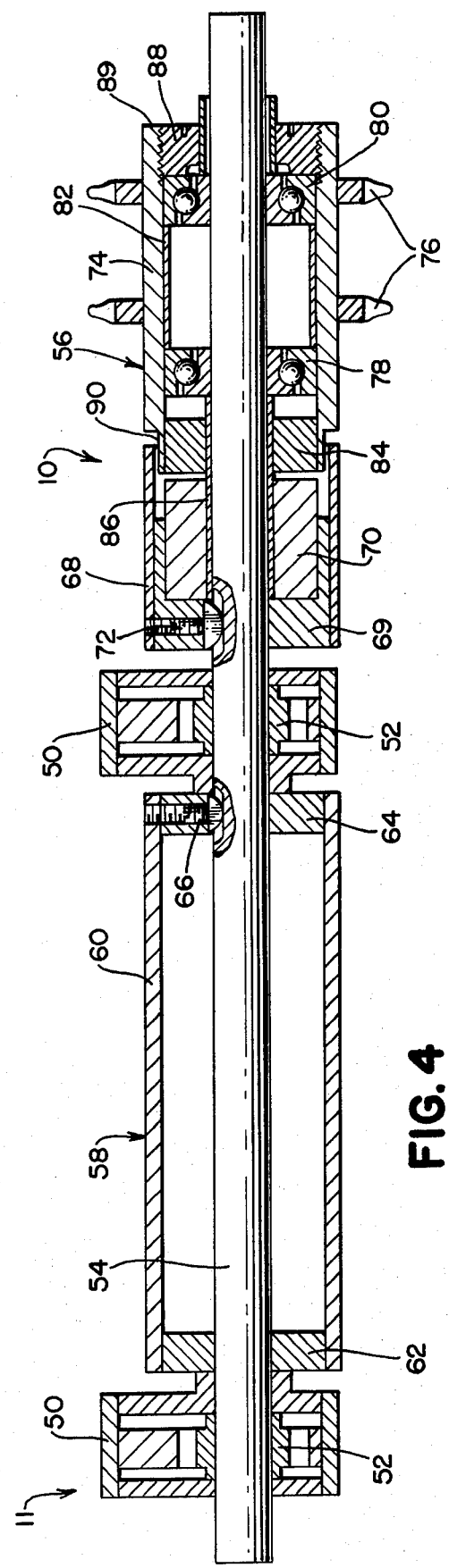

MAGNETIC COUPLING ASSEMBLY FOR ACCUMULATING POWER ROLL CONVEYOR

BACKGROUND OF THE INVENTION

The present invention relates to a conveyor construction, and more particularly, to a magnetic coupling assembly which automatically disengages a conveyor roller from a power drive for the accumulation of parts transported by the conveyor.

Conveyor systems are known which have one or more power driven rollers. In a factory, various parts are placed onto a conveyor to be transported to various locations in a plant, and it is common to have an accumulation of parts which are not taken off the conveyor as quickly as they are put onto the conveyor or are metered for control reasons. The conveyor driving mechanism, conveyor rollers, or the parts themselves may be damaged if the conveyor is continuously powered, and it is not stopped when an accumulation occurs. Thus, it is desirable to provide some means for stopping the conveyor rollers when an accumulation or metering of the items being transported occurs.

Manual controls may be used to stop the conveyor when an accumulation occurs, but an operator is required full-time to watch over the conveyor system and to actuate the controls when necessary. This is not desirable because it is an expensive use of personnel who could be used for other jobs. Further, the additional controls required are expensive and are subject to failure.

Slip clutches have been provided heretofore for the purpose of achieving slippage between driving and driven components when the torque transmitted therebetween reaches a predetermined level. Such previous clutch arrangements have included the use of a plurality of friction disks pressed axially together by force applying means such as springs. Other arrangements employed heretofore include the use of a spring component rigidly fixed to an input roller and frictionally associated with an output roller to slip relative thereto when a predetermined torque is applied to the output roller. In addition to such mechanical arrangements, magnetic and electromagnetic clutches have also been employed to provide slippage between input and output components.

Several disadvantages are attendant to the mechanical and electromechanical slip clutch arrangements heretofore provided. In this respect, friction disk and spring arrangements are subject to physical wear during use which decreases the capability thereof to provide for slippage at a desired torque level. More particularly, as the components of these arrangements wear, slippage occurs at a progressively lower level. Accordingly, frequent adjustment or replacement of parts is required. With electromagnetic slip clutches, an external source of excitation must be provided to obtain the magnetic field for energizing the clutch assembly. This, of course, requires the provision of appropriate electrical connections to the clutch assembly which, together with the provision of an external source of excitation often results in an undesirable complex assembly. Moreover, the level of excitation can vary, whereby slippage can occur at torque levels other than the desired level.

In accordance with the present invention, the foregoing disadvantages, and others, of slip clutches heretofore known are overcome. More particularly, the magnetic coupling assembly of the present invention advantageously provides a substantially constant magnetic force between the driving and driven components whereby slippage is achieved at a substantially constant torque level. Further, the magnetic force is completely internal whereby external excitation is not required and physical wear of the clutch components is essentially non-existent.

SUMMARY OF THE INVENTION

In a first embodiment of the magnetic coupling assembly of the present invention, a drive sprocket and conveyor roll are mounted on a fixed axle between a pair of spaced conveyor side rails. The drive sprocket is automatically disengaged from the conveyor roll when the torque transmitted therebetween reaches a predetermined level.

The conveyor roll or roller includes an elongated tube portion and a magnet retaining sleeve mounted within the tube portion adjacent one of its ends. A cylindrical permanent magnet is secured to the retaining sleeve to form one of the operative elements of the magnetic coupling assembly. The drive sprocket includes a sprocket hub having a field face member secured to one of its ends in opposing relationship to the permanent magnet. By varying the air gap between the permanent magnet and field face member, the torque capacity is varied thereby permitting slippage between the drive sprocket and conveyor roll at different torque levels.

The sprocket hub is mounted on the axle by means of a bearing cartridge assembly which includes a pair of bearings separated by a spacer tube. The field face member is slidably movable along the outer periphery of a thrust tube which is held in position on the axle between the bearing cartridge assembly and a bearing stop within the tube portion of the conveyor roll. An adjustment member is mounted within a threaded end of the sprocket hub in abutting engagement against one side of the bearing cartridge assembly.

When the adjustment member is operated, the sprocket hub is caused to slide on the bearing cartridge assembly such that the field face member moves toward or away from the permanent magnet thereby varying the air gap between the permanent magnet and field face member and changing the torque setting. This will allow for the tranference of driving torque between the drive sprocket and conveyor roll within the limits of the magnetic attractive forces generated between the permanent magnet and field face member.

The magnetic coupling assembly of the present invention provides for broadly adjustable torque settings with slippage occurring at a substantially constant torque level at each setting. Further, long service life is possible with minimum maintenance because of the total bearing construction.

In another form of the invention, the drive sprocket is mounted outboard of the conveyor side rails. In this embodiment, the drive sprocket and conveyor roll are mounted on a rotatable axle but the basic components of the magnetic coupling assembly and their operation are the same as for the first embodiment.

Other advantages and meritorious features of the magnetic coupling assembly will be more fully understood from the following description of the invention, the appended claims, and the drawings, a brief description of which follows.

BRIEF DESCRIPTION OF THE DRAWINGS

FIG. 1 is a fragmentary detail view of a conveyor construction including one form of the magnetic coupling assembly of the present invention.

FIG. 2 is a cross-sectional side elevational view of a first embodiment of the magnetic coupling assembly including a drive sprocket and conveyor roll.

FIG. 3 is a cross-sectional side elevational view of the magnetic coupling assembly in FIG. 2 and illustrating the varying air gap between the permanent magnet and field face member.

FIG. 4 is a cross-sectional side elevational view of a second embodiment of the magnetic coupling assembly illustrating the drive sprocket mounted outboard of the conveyor side rails.

FIG. 5 is a perspective view of the permanent magnet illustrating the plurality of side poles.

DETAILED DESCRIPTION OF THE INVENTION

Referring to FIGS. 1-3, a first embodiment of the magnetic coupling assembly 10 is illustrated on a conventional conveyor construction 11. Conveyor construction 11 includes a pair of spaced side rails 12 mounted on supporting standards (not shown). A number of fixed hexagonal axles 14 (FIGS. 2 and 3) are secured adjacent their ends to the conveyor rails 12 and a drive sprocket 16 and conveyor roll 18 are mounted on each of the axles 14. The magnetic coupling assembly 10 permits automatic disengagement between the drive sprocket 16 and conveyor roll 18 to prevent damage in the event of accumulation or metering of the parts being transported by conveyor 11.

Each conveyor roll 18 includes an elongated cylindrical tube portion 20 which is rotatably mounted on a respective axle 14 by spaced apart bearings 22 and 24. Magnet retaining sleeve 26 is mounted within tube portion 20 adjacent one of its ends 27. A cylindrical permanent magnet 28 is secured to retaining sleeve 26 with a respective axle 14 passing freely through its center. Permanent magnet 28 forms one of the operative elements of the magnetic coupling assembly 10.

Drive sprocket 16 includes a sprocket hub 30 having a sprocket or sprockets 32 mounted on its periphery. Hub 30 is powered for rotative movement by a motor driven chain (not shown) which is entrained around the outer periphery of one of the sprockets 32. The other sprocket 32 is used to transmit powered rotative movement between two successive drive rolls 16 along conveyor 11. Sprocket hub 30 is rotatably mounted on a respective axle 14 by spaced apart bearings 34 and 36. A cylindrical spacer tube 38 is positioned within hub 30 between bearings 34 and 36 to maintain the spaced relationship between the bearings. Bearings 34, 36 and tube 38 form a bearing cartridge assembly for permitting sliding movement of sprocket hub 30, as will be described.

A field face member 40, which forms another operative element of the magnetic coupling assembly 10, is secured on one end of sprocket hub 30 in opposing relationship to permanent magnet 28. Member 40 is slidably movable along the outer periphery of a cylindrical thrust tube 42 which is held in position on axle 14 between bearings 24 and 34. As illustrated in FIG. 2 and 3, permanent magnet 28 and member 40 are rotatably mounted on tube 42 and field face member 40 is movable along the length of tube 42 for varying the air gap 43 between magnet 28 and member 40.

An adjustment member 44 is mounted within the threaded end 45 of sprocket hub 30 in abutting engagement against one side of bearing 36. When member 44 is adjusted, sprocket hub 30 is caused to move along axle 14 on the bearing cartridge formed by bearings 34, 36 and spacer tube 38 such that its end 46 moves into or out of the end 27 of tube portion 20. This varies the air gap 43 between magnet 28 and member 40 as illustrated in FIGS. 2 and 3, thereby changing the torque setting for magnetic coupling 10.

Permanent magnet 28 includes a plurality of side poles 48 which are movable into varying degrees of proximity relative to field face plate 40. This permits the transference of driving torque between drive sprocket 16 and conveyor roll 18 within the limits of the magnetic attractive forces generated between magnet 28 and face plate 40. If the conveyor roll 18 is stopped by an accumulation of parts on conveyor structure 11, drive sprocket 16 continues to rotate without causing structural damage to either the drive sprocket 16, the conveyor roll 18 or the part being conveyed.

As described, spacer tube 38 is positioned between bearings 34 and 36 to form a bearing cartridge assembly for the slidable sprocket hub 30. Further, thrust tube 42 is held in position on axle 14 between bearings 24 and 34. This arrangement permits a wide range of movement for sprocket hub 30 in response to adjustments on member 44. In addition, long service life is possible with minimum maintenance because of the total bearing construction.

The powered rotative movement to drive sprocket 16 is transmitted to conveyor roll 18 due to the magnetic forces acting between magnet 28 and field face 40. If accumulation of the parts on conveyor 11 occurs, drive sprocket 16 continues to rotate and torque limiting slip occurs between magnet 28 and field face 40 which disengages conveyor roll 18. This prevents damage because the magnetic coupling assembly 10 automatically disengages drive sprocket 16 from conveyor roll 18 in the event of an accumulation.

Another form of the invention is shown in FIG. 4. As illustrated in FIGS. 1-3, the drive sprocket 16 is mounted inboard between conveyor side rails 12. It is also within the scope of the present invention to mount the drive sprocket outboard of the side rails 12 as illustrated in FIG. 4.

Referring to FIG. 4, the conveyor construction 11 includes a pair of spaced side rails 50 having a number of rotatable axles 54 secured adjacent their ends within bearings 52 in side rails 50. A drive sprocket 56 and conveyor roll 58 are mounted on each of the rotatable axles 54. Each conveyor roll 58 includes an elongated cylindrical tube portion 60 having end plates 62 and 64. Tube portion 60 is attached to axle 54 by a securing mechanism 66 which passes through end plate 64.

Magnet housing 68 is mounted on axle 54 at a location outboard of conveyor side rails 50. Magnet retaining sleeve 69 is mounted within housing 68, and a cylindrical permanent magnet 70 is secured thereto. Housing 68 and sleeve 69 are secured to axle 54 for rotation therewith by securing means 72. As in the first embodiment, permanent magnet 70 forms one of the operative elements of the magnetic coupling assembly 10.

Drive sprocket 56 includes a sprocket hub 74 having a sprocket or sprockets 76 mounted on its periphery. Hub 74 is powered for rotative movement by a motor driven chain (not shown) which is entrained around the outer periphery of one of the sprockets 76. The other sprocket 76 is used to transmit powered rotative movement between two successive drive rolls 56 along conveyor 11. Sprocket hub 74 is rotatably mounted on axle 54 by spaced apart bearings 78 and 80. A cylindrical spacer tube 82 is positioned within hub 74 between bearings 78 and 80 to maintain the spaced relationship between the bearings. Bearings 78, 80 and tube 82 form a bearing cartridge assembly for permitting sliding movement of sprocket hub 74 as previously described for the first embodiment.

A field face member 84, which forms the other operative element of the magnetic coupling assembly 10, is secured to one end of sprocket hub 74 in opposing relationship to permanent magnet 70. Member 84 is slidably movable along the outer periphery of a cylindrical thrust tube 86 which is held in position on axle 54 by permanent magnet 70. Field face member 84 is movable along the length of tube 86 for varying the air gap 87 between magnet 70 and member 84.

An adjustment member 88 is mounted within the threaded end 89 of sprocket hub 74 in abutting engagement against one side of bearing 80. When member 88 is adjusted, sprocket hub 74 is caused to move along axle 54 on the bearing cartridge formed by bearings 78, 80 and spacer tube 82 such that its end 90 moves into or out of the end of magnet housing 68. This varies the air gap 87 between magnet 70 and member 84 thereby changing the torque setting for the magnetic coupling 10.

Permanent magnet 70 is identical to permanent magnet 28 and includes a plurality of side poles which are movable into varying degrees of proximity relative to face plate 84. This permits the transference of driving torque between drive sprocket 56 and conveyor roll 58 within the limits of the magnetic attractive forces generated between magnet 70 and face plate 84. If the conveyor roll 58 is stopped by an accumulation on conveyor structure 11, drive sprocket 56 continues to rotate without causing structural damage to either the drive sprocket 56, the conveyor roll 58 or the parts being conveyed.

It will be apparent to those skilled in the art that the foregoing disclosure is exemplary in nature rather than limiting, the invention being limited only by the appended claims.

I claim:

1. A magnetic coupling assembly including a drive sprocket and conveyor roll rotatably mounted on a fixed axle between a pair of spaced conveyor side rails, said conveyor roll including an elongated substantially hollow tube portion and a permanent magnet mounted within the tube portion at a location spaced inwardly from one of its ends, said drive sprocket including a hub having a field face member secued within one of its ends in opposing relationship to said permanent magnet, said field face member being spaced from said permanent magnet to form an air gap, means for rotatably driving said hub, said hub being slidably mounted on a bearing cartridge assembly including bearing members and a spacer member, and said field face member being slidably movable along a thrust tube which is held in position on said axle between said bearing cartridge assembly and a stop within said conveyor roll tube portion, and said one end of said hub being movable within said one end of said tube portion, an adjustment member mounted to the other end of said hub in abutting engagement against one of said bearings of said bearing cartridge assembly, said adjustable member being operable to cause slidable movement of said hub on said bearing cartridge assembly such that said field face member is moved along said thrust tube toward and away from said permanent magnet for varying the air gap between said magnet and field face member, and powered rotative movement of said drive sprocket being transmitted to said conveyor roll due to the magnetic forces acting between said magnet and field face member.

2. The magnetic coupling assembly as defined in claim 1 wherein said permanent magnet being cylindrical and including a plurality of magnetic pole faces on one of its sides which are positioned in opposing relationship to said field face member.

3. A magnetic coupling assembly including a drive sprocket and conveyor roll, said conveyor roll mounted on a rotatable axle between a pair of spaced conveyor side rails, said drive sprocket rotatably mounted on said axle at a location outside the confines between said side rails, a magnetic retaining sleeve mounted to said axle adjacent to said drive sprocket and a permanent magnet mounted within said magnet retaining sleeve at a location spaced inwardly from one of its ends, said drive sprocket including a hub having a field face member secured within one of its ends in opposing relationship to said permanent magnet, said field face member being spaced from said permanent magnet to form an air gap, means for rotatably driving said hub, said hub being slidably mounted on a bearing cartridge assembly including bearing members and a spacer member, and said field face member being slidably movable along a thrust tube which is held in position on said axle between said bearing cartridge assembly and said magnet retaining sleeve, and said one end of said hub being movable within said one end of said retaining sleeve, an adjustment member mounted to the other end of said hub in abutting engagement against one of said bearings of said bearing cartridge assembly, said adjustment member being operable to cause slidable movement of said hub on said bearing cartridge assembly such that said field face member is moved along said thrust tube toward and away from said permanent magnet for varying the air gap between said magnet and field face member, and powered rotative movement of said drive sprocket being transmitted to said conveyor roll due to the magnetic forces acting between said magnet and field face member.

4. The magnetic coupling assembly as defined in claim 3 wherein said permanent magnet being cylindrical and including a plurality of magnetic pole faces on one of its sides which are positioned in opposing relationship to said field face member.

* * * * *